United States Patent [19]

Claus

[11] Patent Number: 5,461,217
[45] Date of Patent: Oct. 24, 1995

[54] SECURE MONEY TRANSFER TECHNIQUES USING SMART CARDS

[75] Inventor: David M. Claus, Indianapolis, Ind.

[73] Assignee: AT&T IPM Corp., Coral Gables, Fla.

[21] Appl. No.: 194,186

[22] Filed: Feb. 8, 1994

[51] Int. Cl.$^6$ ............................................. G06K 5/00
[52] U.S. Cl. ............................ 235/380; 235/379; 902/1; 902/4; 380/21; 380/24
[58] Field of Search ................................. 235/380, 492, 235/379; 902/26, 1, 2, 4; 380/21, 22, 24

[56] References Cited

U.S. PATENT DOCUMENTS

| | | | |
|---|---|---|---|
| 4,305,059 | 12/1981 | Benton | 340/825.33 X |
| 4,454,414 | 6/1984 | Benton | 235/379 |
| 4,650,975 | 3/1987 | Kitchener | 235/375 |
| 4,709,136 | 11/1987 | Watanabe | 235/379 |
| 5,012,074 | 4/1991 | Masada | 235/492 X |
| 5,093,862 | 3/1992 | Schwartz | 235/380 X |
| 5,175,416 | 12/1992 | Mansvelt et al. | 235/380 X |
| 5,193,114 | 3/1993 | Moseley | 380/23 |

*Primary Examiner*—Donald Hajec
*Assistant Examiner*—Michael G. Lee
*Attorney, Agent, or Firm*—Steven R. Bartholomew

[57] ABSTRACT

Systems and methods for providing secure electronic financial transactions are disclosed. Money is electronically stored on a plurality of smart cards. At least one smart card is equipped with an electronic security wall having a closed state and an open state. In the closed state, the smart card is disabled from participating in at least one financial transaction, and in the open state, the smart card may participate in at least one financial transaction. At least one smart card is equipped with at least one of a first security key for changing the state of the electronic security wall from the open state to the closed state, and a second security key for changing the state of the electronic security wall from the closed state to the open state. Financial transactions include, for example, electronically transferring money between a bank center and a smart card; electronically transferring money between the first and second smart cards; checking the amount of money stored on a smart card; and adding interest to the amount of money stored on the smart card.

9 Claims, 9 Drawing Sheets

FIG. 2

| SMART CARD 102 | SMART CARD 104 | |
|---|---|---|
| USER SMART CARD (MERCHANT SMART CARD 105 OR CONSUMER SMART CARD 107) | USER SMART CARD | USERS EXCHANGE CARD MONEY IN EXCHANGE FOR GOODS OR SERVICES OR OTHER MONEY. |
| USER SMART CARD | BANK BRANCH SMART CARD 113 | USER GIVES BRANCH CARD MONEY IN EXCHANGE FOR OTHER MONEY. |
| BANK BRANCH SMART CARD 113 | USER SMART CARD | BRANCH ADDS CARD MONEY TO USER IN EXCHANGE FOR OTHER MONEY. |
| BANK BRANCH SMART CARD 113 | BANK REGION SMART CARD 111 | BRANCH GIVES REGION CARD MONEY IN EXCHANGE FOR OTHER MONEY. |
| BANK REGION SMART CARD 111 | BANK BRANCH SMART CARD 113 | REGION ADDS CARD MONEY TO BRANCH IN EXCHANGE FOR OTHER MONEY. |
| BANK REGION SMART CARD 111 | BANK CENTER SMART CARD 109 | REGION GIVES CENTER CARD MONEY IN EXCHANGE FOR OTHER MONEY. |
| BANK CENTER SMART CARD 109 | BANK REGION SMART CARD 111 | CENTER ADDS CARD MONEY TO REGION IN EXCHANGE FOR OTHER MONEY. |

SECURE MONEY TRANSFER TECHNIQUES USING SMART CARDS

TECHNICAL FIELD

This invention relates generally to smart cards, and more particularly to systems and methods for providing secure money transfers between smart cards and financial institutions.

BACKGROUND OF THE INVENTION

Recent developmental efforts have been directed towards using smart cards as vehicles for the storage and transfer of money. Using electronic money in place of conventional bills and coins is advantageous for several reasons. It is often cumbersome and inconvenient to carry around large amounts of money, notwithstanding the ever-present risk of theft or loss. Bills and coins are expensive to produce, and are subject to forgeries. Although some merchants may accept personal checks, the processing of these transactions often proves to be very time-consuming. In practice, existing check verification procedures often involve a time delay sufficient to annoy, irritate, and/or frustrate customers who are waiting in line at the merchant's point-of-sale terminals.

With existing state-of-the-art technology, it is possible to use smart cards as devices on which to electronically store and transfer money. However, a system which does nothing more than electronically store and transfer money is not practical for use in many real-world applications. As with any electronic data storage and transfer system, security breaches are possible. If the concept of electronic money is ever to be generally accepted, electronic money cannot be lost by the application providers or by other participants such as merchants or customers. Although a certain amount of electronic money loss is acceptable and inevitable, these losses must be less than the current losses experienced with credit cards, cash, or checks. Prior-art electronic security measures do not provide an electronic money system having the requisite level of security.

Existing smart card devices are not completely invulnerable to failure. For example, the smart card holder could forget to remove the smart card from his or her pocket, and run the card through an entire washer/dryer cycle, exposing the card to heat, mechanical vibrations, water, and chemically corrosive agents such as bleach and detergent, which could result in a smart card failure. Upon device failure, the hapless smart card holder ends up losing the amount of money stored on the now-defunct card. What is needed is a recovery technique applicable to smart cards that have become inoperable, so that the smart card holder does not suffer a financial loss due to card failure.

Many state-of-the-art electronic financial transaction systems offer little or no customer privacy. This lack of privacy stems from the fact that current system architectures offer paid interest and/or protection for lost/stolen cards. As a result, those customers who desire privacy must pay in cash in order to attain transactional anonymity. Since conventional paper money offers virtual anonymity, the concept of electronic money should provide a similar degree of anonymity. At the very least, an electronic system should provide anonymity upon customer request.

SUMMARY OF THE INVENTION

Systems and methods for providing secure electronic financial transactions are disclosed. A monetary value is electronically stored on a card which includes an electronic security lock having a closed state and an open state. In the closed state, the lock disables the smart card from transferring any of the monetary value, and in the open state, the smart card is equipped to transfer all or a portion of the monetary value. The smart card includes an electronic security key for changing the state of the electronic security lock from the open state to the closed state, and for changing the state of the electronic security lock from the closed state to the open state.

DETAILED DESCRIPTION

Figure 1:
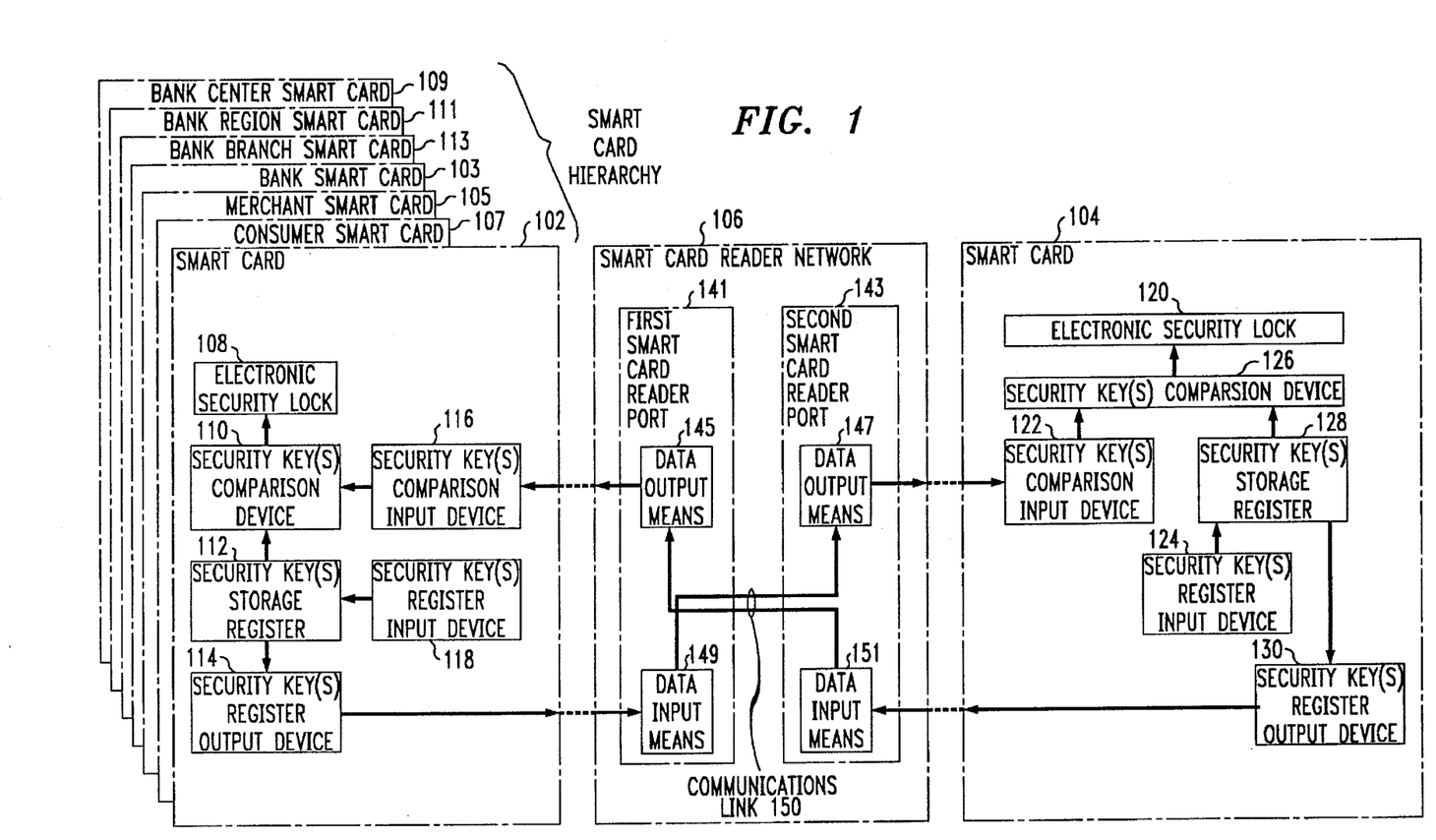
FIG. 1 is a block diagram showing a secure smart card money transfer system.

Techniques are disclosed for the secure transfer of a monetary value (hereinafter "money") between smart cards. FIG. 1 is a block diagram setting forth hardware components and data structures for a smart card secure money transfer system. This system also provides for adding interest payments to money stored on a smart card, and for checking the amount of money (account balance) stored on a smart card. Activities such as the transfer of money between smart cards, adding interest payments to a smart card, and checking account balances are referred to as financial transactions.

Smart cards 102, 104 are provided to a plurality of cardholders, including a first smart card 102 provided to a first cardholder and a second smart card 104 provided to a second cardholder, each smart card 102, 104 being capable of participating in one or more financial transactions involving electronic money stored on the smart card. The first cardholder may hold, for example, a bank smart card 103, a merchant smart card 105, or a consumer smart card 107. Independent of the type of smart card hold by the first cardholder, the second cardholder may hold a bank smart card 105, a merchant smart card 105, or a consumer smart card 107. If a cardholder holds a merchant smart card 105, or a consumer smart card 107, the smart card held by this cardholder is referred to as a user smart card.

If a cardholder is a bank, the smart card provided to the bank is termed a bank smart card. Banks may be organized into a plurality of regions, each region consisting of one or more branch banks. In this situation, three subtypes of bank smart cards 103 may be utilized, such as bank center smart cards 109, bank region smart cards 111, and bank branch smart cards 113. Bank center smart cards 109 are used to provide one or more electronic security keys to other smart cards, such as other bank smart cards 103, smart cards held by merchants, and/or smart cards held by consumers. These security keys may be updated (i.e., periodically changed) to allow and/or to disallow the transfer of money to/from a smart card.

Bank center smart cards 109 are used to provide interest payments to other smart cards, such as to other bank smart cards 103 and to user smart cards (cards held by merchants or consumers). Interest payments can be implemented in a hierarchical manner with respect to a predefined smart card hierarchy. For example, a bank center smart card 109 may be employed to provide interest payments to bank region smart cards 111. Similarly, the bank region smart cards 111 may be used to provide interest payments to banjo branch smart cards 113, which, in turn, provide interest payments to smart cards held by consumers and merchants. Thus, the smart card hierarchy in this example is structured such that a bank center smart card 109 is at the top of the hierarchy, followed by bank region smart cards 111 and bank branch smart cards 113. User smart cards are at the bottom of the hierarchy. The mechanics of interest payments will be described in greater detail hereinafter with reference to FIG. 1.

Each smart card 102, 104 contains the data structures and hardware blocks described below in conjunction with FIG. 1, irrespective of whether the smart card is a user smart card, such as a merchant smart card 105 or a consumer smart card 107 or a bank smart card 103. Each smart card 102, 104 contains a security key storage register 112, 128, respectively, for the storage of an electronic security key. The security key storage register 112, 128 may be provided in the form of random-access memory (RAM). The security key register 112, 128 is coupled to a security key register input device 118, 124, respectively, which is adapted to accept input from a smart card reader network 106. In this manner, an electronic security key may be transferred from the smart card reader network 106 into the smart card security key storage register 112. The security key register input device 118, 124 is equipped to accept input data in accordance with presently-existing smart card data input/output (I/O) techniques well-known to those skilled in the art.

A security key register output device 114, 130 is coupled to the security key storage register 112, 128, respectively. This output device 114, 130 is equipped to copy the contents of the security key storage register 112, 128, respectively, into the smart card reader network 106. The security key storage register 112, 128 is coupled to a first input of a security key comparison device 110, 126, respectively. A second input of the security key comparison device 110, 126 is connected to a security key comparison input device 116, 122, respectively.

The security key comparison device 110, 126 is equipped to compare the first input with the second input, and to generate a signal at a comparison device output, such that the generated signal is based upon the results of the comparison. If the first and second inputs are identical, the security key comparison device 110, 126 generates a match signal at the comparison device output. If the first and second inputs are not identical, the security key comparison device 110, 126 generates a no-match signal at the comparison device output.

The comparison device 110, 126 output is coupled to an electronic security lock 108, 120, respectively. The security lock 108, 120 may be placed into any one of two mutually-exclusive states. In a first, locked state, the security lock 108, 120 disables the smart card 102, 104 from transferring money to another smart card. In a second, unlocked state, the security lock 108, 120 permits money to be transferred to another smart card. The security lock 108, 120 is coupled to the output of comparison device 110, 126, respectively. When the comparison device 110, 126 produces the match signal, the security lock 108, 120 is placed into the second, unlocked state. The security lock 108, 120 is placed into the first, locked state upon receipt of a no-match signal from the comparison device 110, 126.

The functions of the electronic security lock 108, 120 and security key comparison device 110, 126 may be implemented using a microprocessor device of the type well-known to those skilled in the art and utilized in various existing smart card designs. The functions of the security key storage register 112, 128 may be implemented using the microprocessor described above, and/or such a register may be provided in the form of random-access memory (RAM). The security key register input device 118, 124, the security key comparison input device 116, 122, and the security key register output device 114, 130 operate under the control of the above-described microprocessor, and may be implemented using conventional smart card data I/O devices which provide for the exchange of data between a smart card 102, 104 and a smart card reader network 106. Conventional smart card data I/O devices and smart cards 102, 104 are well-known to those skilled in the art.

Smart card reader network 106 comprises a configuration of two or more conventional smart card reader ports, such as a first smart card reader port 141 and a second smart card reader port 143. First and second smart card reader ports 141, 143 are of the type well-known to those skilled in the art, to permit substantially concurrent exchange of data between two smart cards 102, 104. First smart card reader port 141 may be situated at a remote location with respect to second smart card reader port 143. Accordingly, first and second smart card reader ports 141, 143 are linked together over a communications link 150. In the case where smart card reader ports 141, 143 are widely-separated, this communications link 150 may comprise modems communicating over a conventional telephone connection. Alternatively, smart card reader ports 141, 143 may be integrated into a single structure and connected using a communications link 150 comprising, for example, simple wire pairs. First and second smart card reader ports 141, 143 may also include smart card holder input means, such as a keypad, to permit the entry of data such as PINs (personal identification numbers) by smart card holders. These smart card reader ports 141, 143 include data input means 149, 151 and data output means 145, 147, for, respectively, accepting data from, and providing data to, a smart card. The data output means 145 of smart card reader port 141 is linked to the data input means 151 of smart card reader port 143. Likewise, the data input means 149 of smart card reader port 141 is linked to the data output means 147 of smart card reader port 143.

The flow of data between smart card reader port 141 and smart card reader port 143 may be controlled by an optional smart card reader microprocessor internal to the smart card reader network 106. The smart card reader microprocessor is of a type well-known to those skilled in the art. If a smart card reader microprocessor is not used, the microprocessors within the smart cards 102, 104 are employed to control the flow of data across smart card reader network 106.

To implement an exchange of money between two smart cards 102, 104, the system of FIG. 1 operates as follows. Assume that money is to be transferred from smart card 102 to smart card 104. Smart card 102 is inserted into smart card reader port 141, and smart card 104 is inserted into smart card reader port 143. The microprocessor within smart card 102 exchanges initial handshaking information with the microprocessor of smart card 104 to ascertain that both smart cards are communicating across the smart card reader network 106. Next, the security key register output device 114 of smart card 102 sends a signal representing an electronic security key to data input means 149 of smart card reader network 106. The security key is transferred to the data output means 147, and conveyed to security key comparison input device 122 of smart card 104.

The security key comparison device 126 retrieves the security key stored in security key storage register 128 on smart card 104. If the comparison device 126 ascertains that the security key received from smart card 102 matches the security key stored in the security key storage register 128, the electronic security lock 120 within smart card 104 is unlocked to enable smart card 104 to participate in one or more financial transactions with smart card 102. If, however, the security key retrieved from security key storage register 128 does not match the security key received from smart card 102, smart card 104 is disabled from participating in all financial transactions.

The security key comparison process implemented by smart card 104 is also performed by smart card 102. Smart card 104 retrieves the security key stored in security key storage register 128 and conveys the security key to security key register output device 130. The security key is received by data input means 151 of smart card reader network 106, and sent to data output means 145. The security key is forwarded by data output means 145 to security key comparison input device 116 of smart card 102. Security key comparison input device 116 sends the security key to security key comparison device 110. Meanwhile, the security key stored in security key storage register 112 is sent to security key comparison device 110, where the security key from storage register 112 is compared with the security key received from smart card 104. If these security keys match, the security key comparison device 110 provides an "unlock" signal to electronic security lock 108 which unlocks the security lock, permitting smart card 102 to participate in one or more financial transactions with smart card 104. If, however, the security keys do not match, comparison device 110 provides a "lock" signal to electronic security lock 108. Electronic security lock 108 responds to the lock signal by disabling smart card 102 from participating in any financial transactions.

In the above-described example, the electronic security locks 108, 120 of both smart cards 102, 104 must be unlocked in order to permit a financial transaction to take place between these smart cards. If the above-described exchange of security keys results in the locking of one or both of the electronic security locks 108, 120, no financial transactions can take place between smart cards 102 and 104.

The example set forth above assumes that each smart card 102, 104 contains one security key in security key storage register 112, 128, respectively. However, the example of one security key was described for ease of illustration. Any desired number of security keys may be employed to meet the requirements of specific design applications. According to one embodiment set forth herein, each smart card 102, 104 employs four security keys which are stored in security key storage register 112, 128, respectively. Security key comparison device 110 compares all four security keys stored in smart card 102 with all four security keys received from smart card 104. Similarly, security key comparison device 126 compares all four security keys stored in smart card 104 with all four security keys received from smart card 102. If at least two of the security keys match, the respective electronic security lock 108, 120 is unlocked. If less than two of the four security keys match, the respective security lock 108, 120 is locked.

In the embodiment which utilizes four security keys per smart card, the security keys can be updated and/or changed to provide improved system security. Bank smart cards are used to update/change the security keys stored in user smart cards. More particularly, assume for purposes of this illustration that smart card 102 is a bank smart card. Bank smart cards are equipped to retrieve a security key from the bank smart card security key storage register 112 and convey the key to the bank smart card security key register output device 114 (user smart cards are also so equipped). The output device 114 sends the security key to data input means 149 of smart card reader network 106, along with a bank smart card signal which serves to identify bank smart cards from all other types of smart cards, such as user smart cards.

The security key and the bank smart card signal are conveyed to data output means 147. The microprocessor of smart card 104 recognizes the bank smart card signal at data output means 147 and, in response to this signal, places the security key at data output means 147 into security key storage register. When the newly-received security key is placed into security key storage register 128, it replaces one of the previously-existing security keys stored in register 128. In this manner, transactions between user smart cards and bank smart cards are used to update/change one or more security keys in user smart cards. The security keys are changed from time to time to provide an enhanced measure of security. The keys can be changed periodically, i.e, at regular time intervals, or, alternatively, the keys may be changed at random time intervals, if desired.

The smart card money transfer system of FIG. 1 utilizes three types of software. These are exchange software, interest/key update software, and administration software. Exchange software (for example, the program referred to hereinafter as EXCH.INI in FIG. 7 (702) enables money to be transferred from one smart card to another. Interest/key software enables interest payments to be made to a smart card, and administration software enables the performance of various administrative functions. These administrative functions may include, for example, updating a file which lists and identifies all "bad" smart cards, and/or updating a file containing the current interest rate to be paid to specific smart cards. "Bad" smart cards may include defective, failed, stolen, "foreign" (non-system) and/or counterfeit smart cards. A specially-designated administrative smart card may be used to perform the aforementioned administrative function, in conjunction with a card reader and a computer. This administrative card contains the hardware and data structures of FIG. 1. All software is executable on conventional personal computers, and/or on smart card reader software platforms which contain processing devices.

Some of the software used by the smart card money transfer system can reside on the smart cards 102, 104. If desired, this software can be placed into a ROM device on the smart card. For example, three programs may advantageously be placed onto the smart cards 102, 104. The first such program is a routine entitled EXCH.INI and provides the data structures and functions necessary to implement financial transactions. This program also enables the smart cards to receive electronic security keys and interest payments. This executable program preferably resides on all user smart cards, including bank center smart cards.

The second program which may reside on the smart cards 102, 104 is entitled INT.EXE, and provides the data structures and functions necessary to update electronic security keys. The program also implements the process of giving interest to another bank smart card or to a user smart card such as a card held by a merchant or a consumer. The third routine which may be placed on a smart card is entitled issue.exe, and permits an administrative smart card to issue a bank or user smart card.

The smart card money transfer system (FIG. 1) performs financial transactions which involve, for example, the transferring of money from one card to another. However, money is only "created" using a specially-designated bank center smart card having hardware and data structures as shown in FIG. 1. The "creation" of money refers to the fact that, in this case, money is put onto a smart card without taking money from another smart card. The same general concept holds true for electronic security keys. These keys are loaded into bank center smart cards by a system administrator, and are then electronically transferred to other smart cards via card reader network 106.

The smart cards may be organized into a hierarchical structure. For example, the top level includes one or more bank center smart cards, the second level includes one or more bank region smart cards, at the third level are bank branch smart cards, and at the fourth level are the user smart cards which include merchant smart cards and consumer smart cards. Security keys and interest payments flow down the hierarchical ladder from the top levels to the lower levels.

Security functions for the smart card financial transaction system are performed by one or more electronic security keys. In addition to the security keys, proprietary information may also be incorporated into the system to provide an enhanced level of security. However, security is a relative concept. Practically speaking, irrespective of the level of technical sophistication employed, there is no such thing as an invulnerable security system. By way of example, it is certainly possible for people to make their own dollar bills. However, the cost is high, and the penalty is great for getting caught. The security keys 112, 114, 116 provide a measure of security analogous to that provided by the dollar bill, in terms of the aforementioned costs and penalties.

The security provided by security keys is such that all individuals involved in the implementation of security functions for the smart card financial transaction system could leave the system, but none of these individuals would be able to break the system without detection and immediate correction. To provide this level of security, it is not possible to rely solely on proprietary information. However, proprietary information is valuable in preventing attacks from outside individuals who were never affiliated with the security system. For this reason, proprietary information is combined with other forms of security to provide an enhanced level of security not otherwise possible.

Security keys are provided in the form of four application keys stored on each smart card 102, 104. These application keys are stored as numerical values in smart card 102, 104 memory. During each financial transaction with a bank center smart card, the numerical value stored in one application key is updated. Two valid application keys are required to successfully implement a financial transaction. The application keys stored in a bank center smart card are updated from time to time, for example, such that each application key is valid for one month. In this manner, the maximum amount of time that a cardholder can go without a bank transaction is three months. However, this number can be changed to meet the needs of specific system requirements by adding more application keys to each smart card, and/or by changing the amount of time for which each application key numerical value is valid. The bank could use eight keys and change one key per day. In this case, every smart card holder would have to hold a financial transaction with the bank at least once per week. Although the application keys may be periodically updated at regular time intervals, periodicity is not required. The application keys could be updated dynamically at irregular time intervals.

To implement the application keys, each smart card 102, 104 may be equipped with a file called KEY_NUMBER. This file specifies numerical values corresponding to specific application keys. KEY_NUMBER also stores the most recent date for which a key was updated. For example, the application key numerical values may be changed once per month, with numerical values 51, 52, 53, and 54 corresponding to months 51 through 54, respectively.

For two smart cards 102, 104 to implement a successful transfer of money, these smart cards must have at least two identical application keys. If smart card 102 contains application keys of 49, 50, 51, and 52, whereas smart card 104 contains application keys of 51, 52, 53, and 54, the money transfer can be successfully implemented, due to the presence of two identical keys—namely, 51 and 52. However, if the application keys of smart card 102 are 51, 52, 53, and 54 whereas the application keys of smart card 104 are 54, 55, 56, and 57, it would not be possible to implement a successful money transfer between these two smart cards 102, 104.

Each user smart card 102, 104 is assigned an account number of 16 digits (8 bytes). One or more of the smart cards 102, 104 may become lost or stolen. Such cards are known as "bad" cards, and are not allowed to receive application key updates. Bank smart cards corresponding to each level in the smart card bank hierarchy mentioned above may be 8K smart cards equipped to store account numbers for up to 600 bad cards. Assuming that up to 10% of the user smart cards 102, 104 in a given system become lost or stolen (this figure conforms to the credit card industry norm), then one bank center smart card can manage a pool of 6000 user smart cards.

Managing a pool of 6000 user smart cards 102, 104 can be performed at the bank region hierarchical level. In this manner, one or more specific application key updates are limited to a predetermined section of account numbers, e.g., 40000 to 46000, such that these account numbers correspond to smart cards serviced by a given bank region, and/or a given branch bank. To improve upon this branch bank scenario, it may be assumed that each bank branch only handles smart cards with account numbers in a certain range. If this assumption holds true, then only four bytes (the last four digits) of the account numbers need to be stored at the bank branch level.

Techniques for managing bad smart cards are important, because the effectiveness of these techniques can determine the overall profitability or loss of a given smart card system. If smart card system operators are careless, and if inadequate bad card management techniques are employed, the operator may end up losing more money per customer than it is possible to recover.

After the keys on a bad card expire, the card can be removed from the bad card list. Therefore, a bank branch card can store 1200 bad card numbers and manage a pool of 24,000 user cards, assuming that only 5% of the user smart cards are on the bad card list at any one time.

If no more than 10% of the user smart cards corresponding to a particular bank branch will ever be stolen, then the next hierarchical level (say the "bank region") would be able to handle 6,000 bank branch smart cards. The total number of customers in this scenario can thus be 144 MILLION. Because it may be desirable to provide larger total system capacity, another hierarchical lever may be used, termed "bank center". The bank center smart card 103 can handle up to 6,000 bank region cards, and thus provide plenty of total system capacity.

With respect to smart card update time, assume that it takes 10 seconds (maximum) to update a smart card. Further assume that 24,000 people want to update their keys in that one hour. The system must have the equivalent of 24 bank branch smart cards working full time. If the bank branch smart cards are duplicated, each of these cards is issued a different account number so that the generation process can be performed and managed by a smart card. A given smart card account number should never be issued more than once. Therefore, taking this reduction into account, the maximum number of user smart cards 102, 104 in a region is 6 million. Because the bank branch cards can be assigned update times, bank region cards need not be duplicated.

All security keys are generated by a bank center smart card which has the structure of smart card 102 and further includes a random number generator. The security key storage register of the bank center smart card is loaded with the security keys necessary to generate and update all other smart cards. After the original card issuing process, this is how security key updates proceed. A command is sent to the bank center card to update its date and security keys. The bank center card generates a new security key using its random number generator and updates a first application key corresponding to this new security key and increments the KEY_NUMBER file. The KEY_NUMBER file is updated with a new date. A new interest rate can also be loaded into the bank center smart card at this time.

After the bank center smart card updates its security keys, it has scheduled transactions with all of the bank region smart cards in order to update their security keys. The bank region smart cards then update the bank branch smart cards. And finally the bank smart branch cards update the user smart cards.

Figure 2:
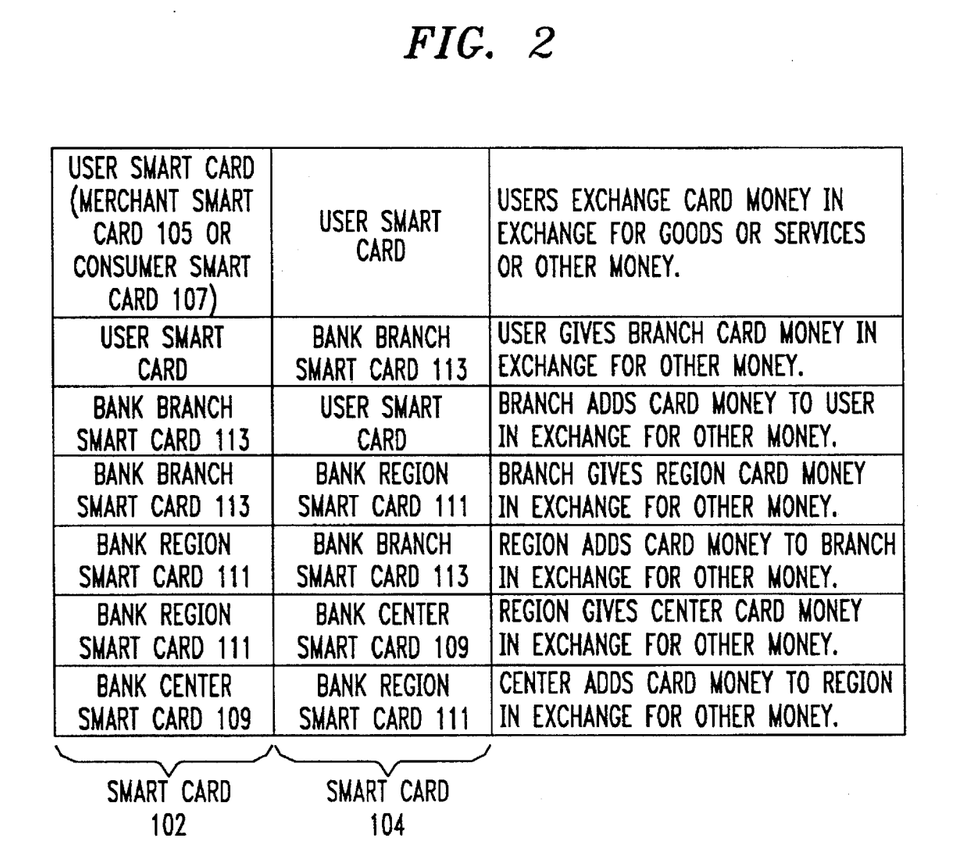
FIG. 2 is a chart which describes a secure financial transaction between two smart cards.

In general, money can only be added to one smart card when it is taken away from another smart card. The exception to this is the bank center smart card. A bank center card key exists which contains key values matching the application key values stored in the bank center smart card. Whoever holds this key can create money by updating this card's balance file. This person cannot read the application keys on the bank center card. To get this money down the pyramid of cards from the bank center smart card to the user smart cards 102, 104, a bank region cardholder would request a transfer of say $1 million card dollars in exchange for a like transfer of money in another form. Approval is given by the bank center cardholder typing in the correct key (most likely a different key than that used to create money). This money goes down the pyramid of cards until it reaches the cardholders themselves. If the application is growing, then the flow of card money should be down and the flow of other money should be up. For example, in a card money exchange involving two smart cards, smart card 102 and smart card 104, the cards smart card 102 and smart card 104 may be any of the cards specified in FIG. 2. For a given pair of cards smart card 102 and smart card 104, FIG. 2 describes the nature of the financial transaction which may take place.

Financial transaction flow will now be described. These transactions are capable of being performed over a remote link. The transactions always take place between two cards. Smart card readers and PC software serve merely to connect the cards and provide user input. A conventional smart card reader is used at both ends of the link, each sender having a keypad for PIN or key input (similar to an ATM or Telephone Adapter with small keypad). These readers are well-known to those skilled in the art.

Figure 3:
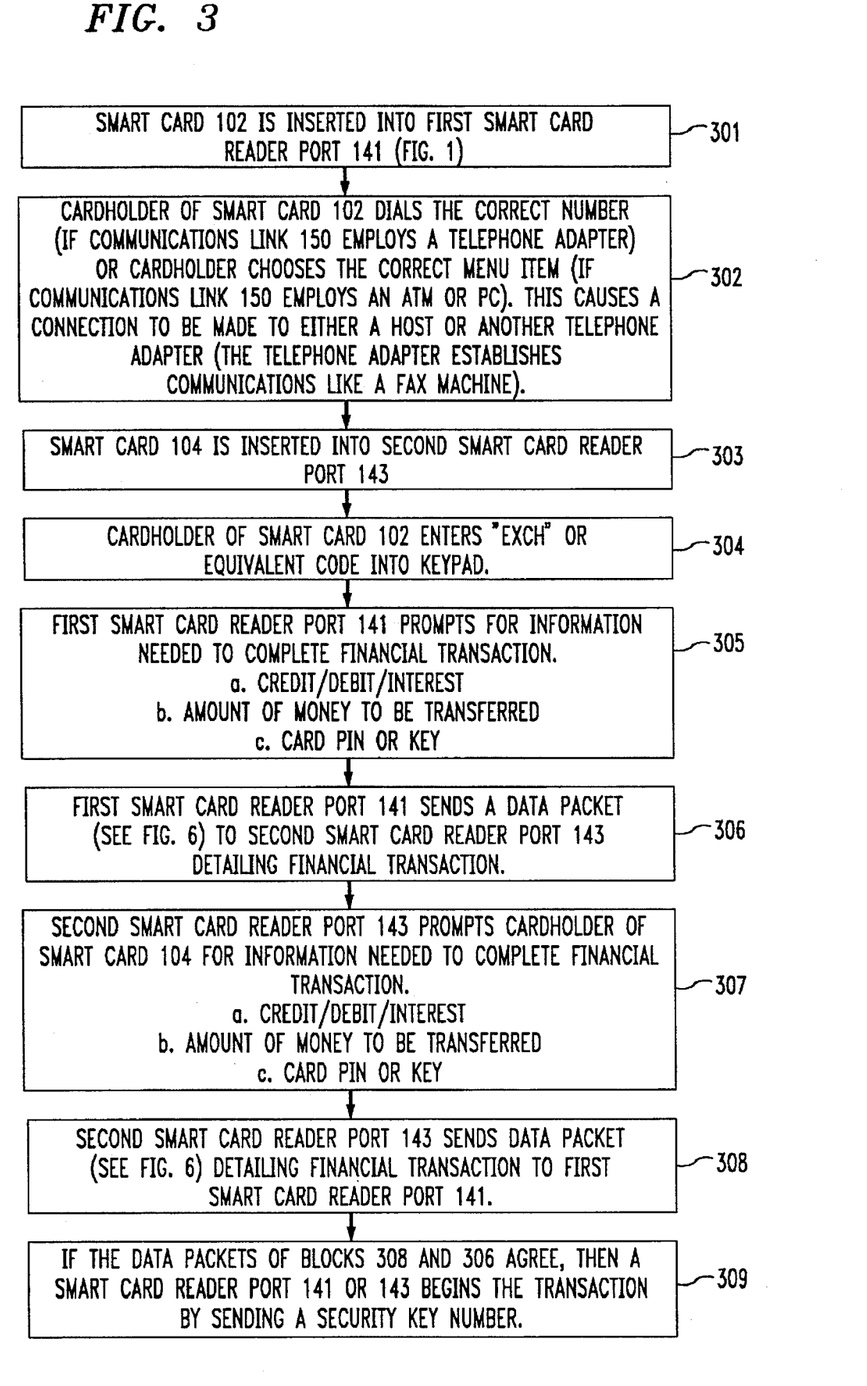
FIG. 3 is a flowchart which sets forth the operational sequence for implementing a secure smart card financial transaction.

The financial transaction proceeds as indicated in FIG. 3. First, in block 301, smart card 102 (a first smart card) is inserted into first smart card reader port 141 (a first smart card reader). Next, the cardholder corresponding to the first smart card smart card 102 dials the telephone number (if the reader includes a Telephone Adapter) or chooses the correct menu item (if using an ATM or PC-based card reader) to dial up a host computer and/or another telephone adapter. This causes a connection to be made to either a host computer or another Telephone Adapter (block 302).

At block 303, a second smart card, smart card 104, is inserted into second smart card reader port 143 (a second smart card reader). Then smart card 102's cardholder enters "EXCH" or equivalent code into the reader first smart card reader port 141 keypad (block 304).

At block 305, first smart card reader port 141 prompts for information needed to complete the financial transaction. This information may include:

a. Credit/Debit/Interest b. Amount of Money to be Transferred c. Card PIN or Security Key Numerical Value Then, first smart card reader port 141 lends a data packet to second smart card reader port 143 detailing the financial transaction (block 306).

At block 307, second smart card reader port 143 prompts the cardholder corresponding to smart card 104 for information needed to complete the financial transaction. This information may include:

a. Credit/Debit/Interest b. Amount of Money to be Transferred c. Card PIN or Security Key Numerical Value At block 308, second smart card reader port 143 sends a data packet detailing the financial transaction to first smart card reader port 141. If the data packets sent in blocks 306 and 308 are identical, then the card reader specified by the following table begins the transaction by sending a security key numerical value. Therefore it does not matter which cardholder begins the transaction; from this point on it follows a standard flow based on the transaction type.

| Financial Transaction | First Reader |
|---|---|
| Smart card 102 sends card money to smart card 104 | second smart card reader port 143 |
| Smart card 102 receives card money from smart card 104 | first smart card reader port 141 |
| Smart card 102 receives interest & security keys from smart card 104 | first smart card reader port 141 |
| Smart card 102 sends interest & security keys to smart card 104 | second smart card reader port 143 |

The following sections detail the first and last financial transaction listed in the above table. The remaining two financial transactions are the same if smart card 102 and smart card 104 are switched.

Figure 4A:
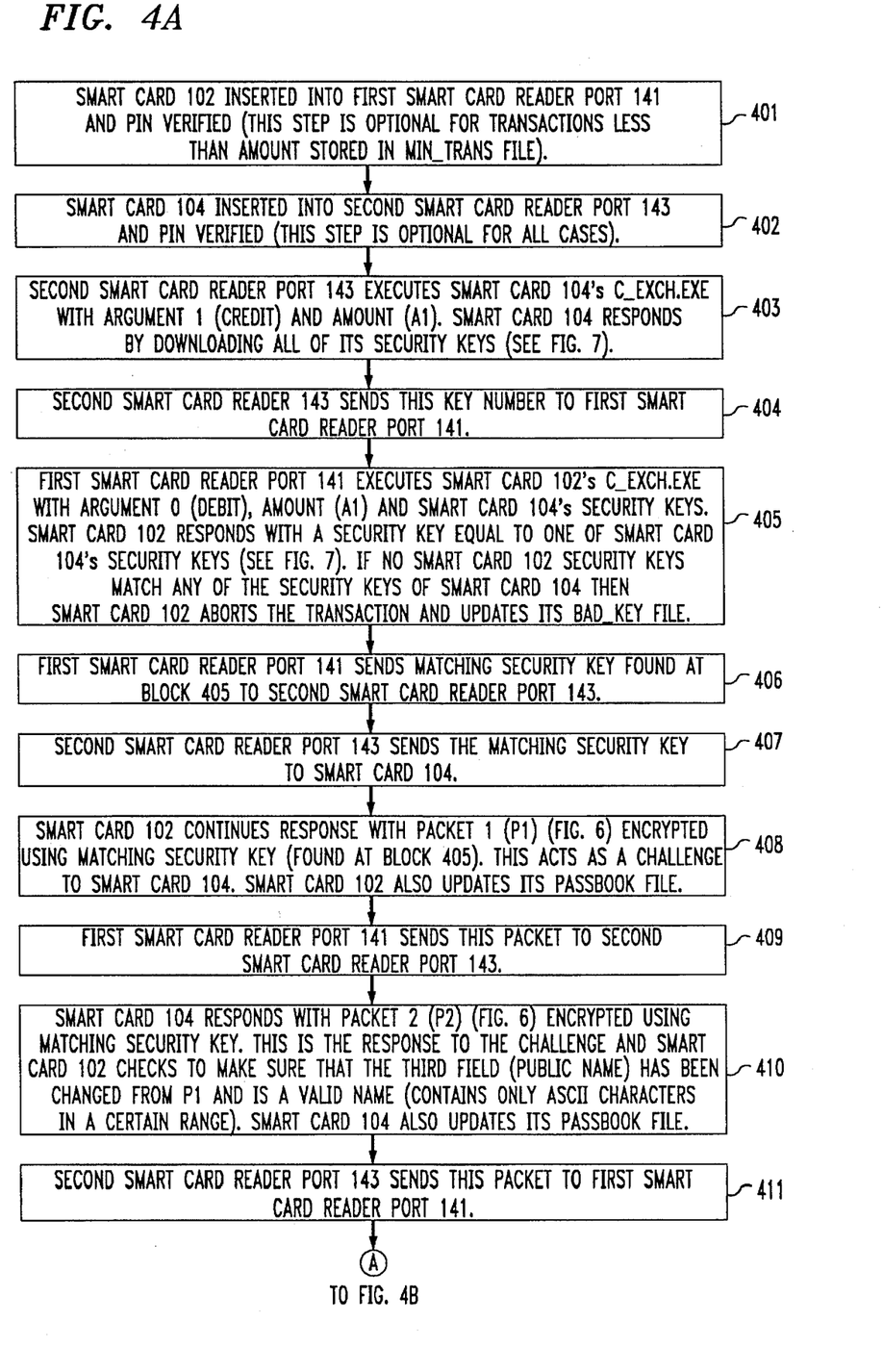
FIGS. 4A and 4B together comprise a flowchart which describes the steps of a cardholder-to-cardholder transaction.
Figure 4B:
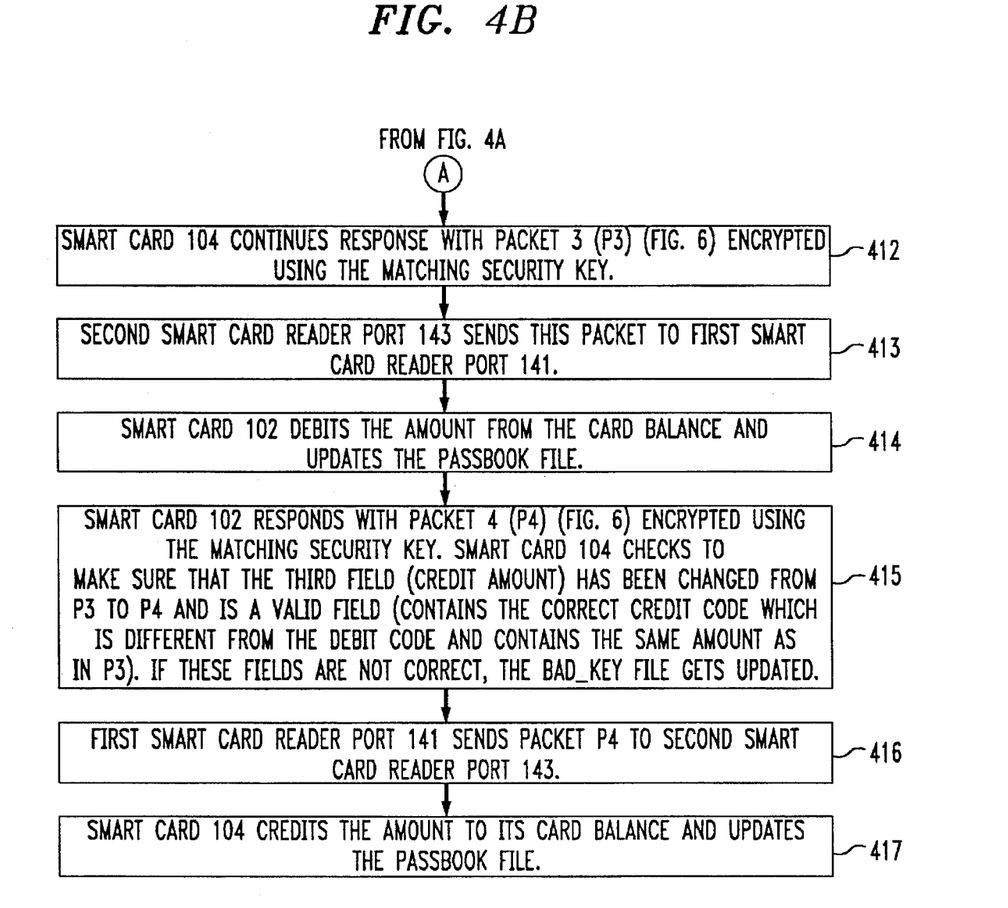

FIGS. 4A and 4B describe the steps of a cardholder-to-cardholder transaction. Smart card 102 stands for card 1 and is the card of the person "spending the money". smart card 104 stands for card 2 and is the card of the person "receiving the money". At block 401, smart card 102 is inserted and a card PIN is verified (this verification substep is optional for transactions less than an amount stored in a MIN_TRANS file). Next, smart card 104 is inserted and PIN verified (this verification substep is optional for all cases) (block 402). At block 403, second smart card reader port 143 executes smart card 104's C_EXCH.EXE program described previously, with input variables specifying a credit and an amount A1. Smart card 104 responds by downloading all of its security keys. Then, second smart card reader port 143 sends this security key number to first smart card reader port 141 (block 404).

First smart card reader port 141 executes smart card 102's C_EXCH.EXE program with input variables specifying debit, amount (A1) and smart card 104's security keys. Smart card 102 responds with a security key one of smart card 104's security keys. If no smart card 102 security keys match any of the security keys of smart card 104 then smart card 102 aborts the transaction and updates the BAD_KEY file (block 405). At block 406, first smart card reader port 141 sends a matching security key found at block 405 to second smart card reader port 143. Second smart card reader port 143 sends the key number response to smart card 104. Smart card 102 continues response with packet 1 (P1) encrypted using the matching security key (found at block 405). This acts as a challenge to smart card 104. Smart card 102 also updates it PASSBOOK file (block 408). First smart card reader port 141 sends this packet to second smart card reader port 143 (block 409). Smart card 104 responds with packet 2 (P2) encrypted using the matching security key. This is the response to the challenge and smart card 102 checks to make sure that the third field (public name) has been changed from P1 and is a valid name (contains only ASCII characters in a certain range). Smart card 104 also updates its PASSBOOK file (block 410). Second smart card reader port 143 sends this packet to first smart card reader port 141 (block 411 ). Smart card 104 continues response with packet 3 (P3) encrypted using the matching security key. This acts as a challenge to smart card 102 (block 412 ). Second smart card reader port 143 sends this packet to first smart card reader port 141 (block 413). Smart card 102 debits the amount from the card balance and updates the PASSBOOK file (block 414). Smart card 102 responds with packet 4 (P4) encrypted using the matching security key. Smart card 104 checks to make sure that the third field (credit amount) has been changed from P3 to P4 and is a valid field (contains the correct credit code which is different from the debit code and contains the same amount as in P3). If these fields are not correct, the BAD_KEY file gets updated (block 415). First smart card reader port 141 sends this packet second smart card reader port 143 (block 416). Smart card 104 credits the amount to its card balance and updates the PASSBOOK file (block 417).

Figure 5A:
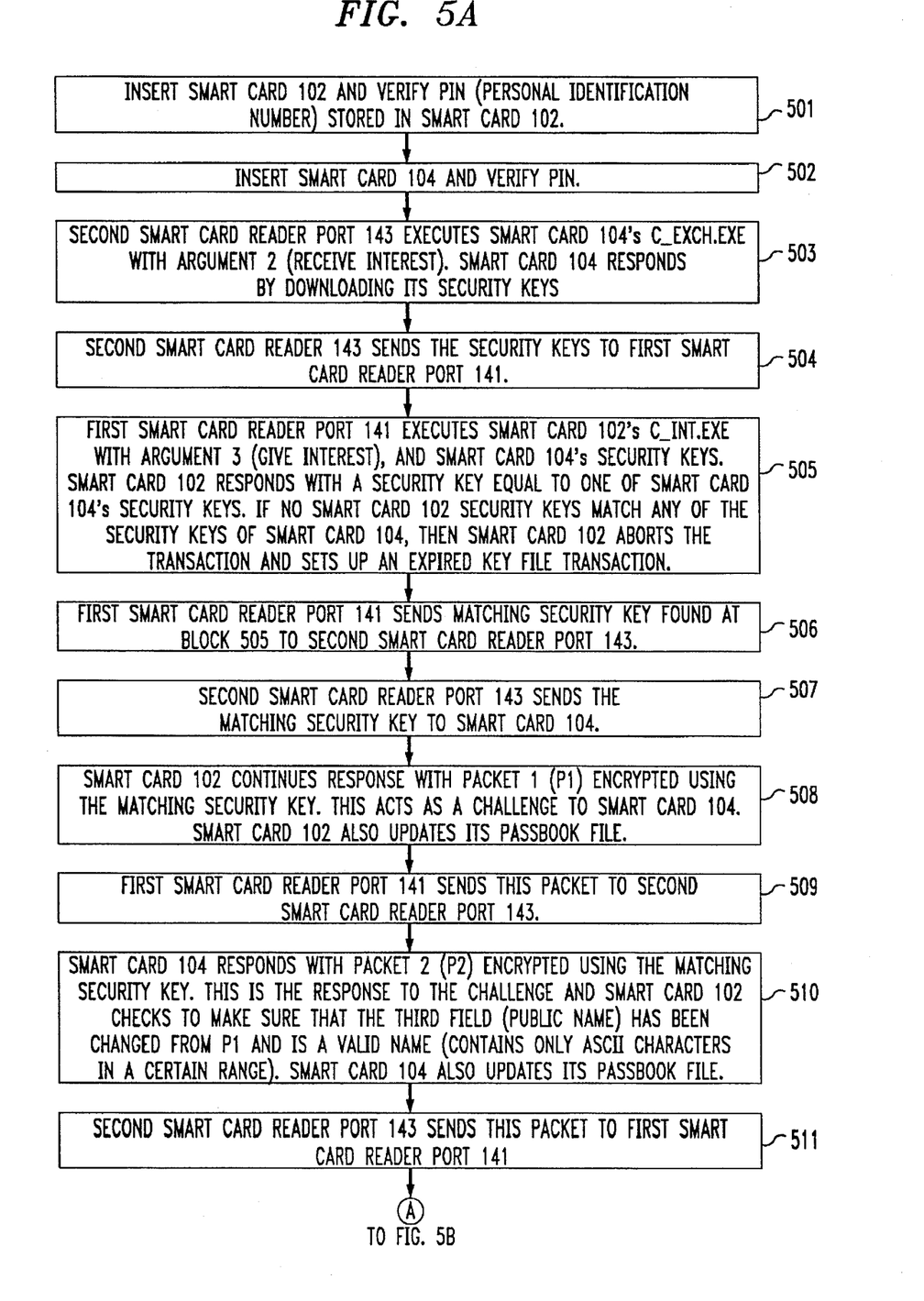
FIGS. 5A and 5B together comprise a flowchart which sets forth the procedure for updating/changing security keys, and for adding interest to money stored on smart cards.
Figure 5B:
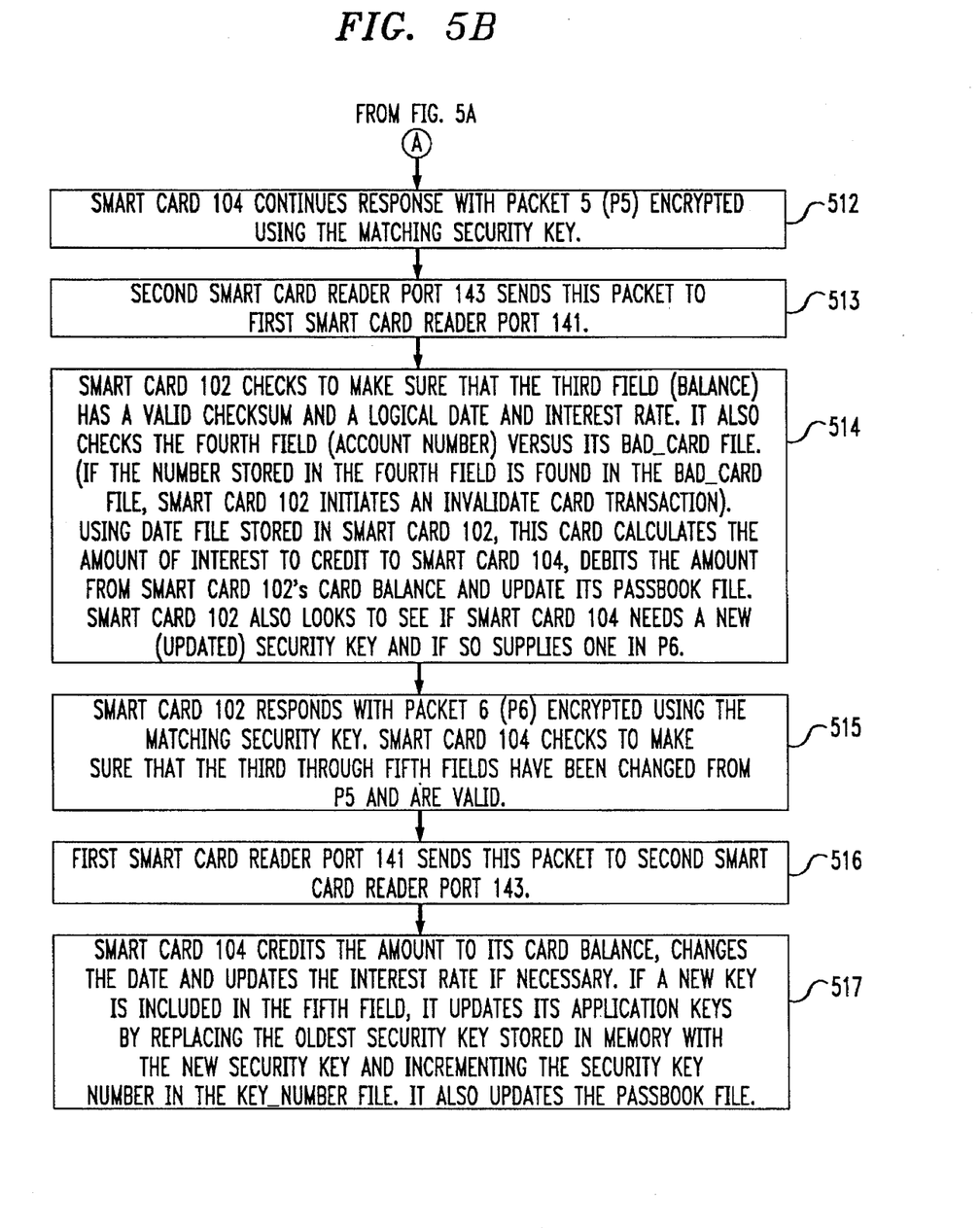

Security key update and interest transactions will be described with reference to FIGS. 5A and 5B. These are transactions between a user card and a bank branch card (or equivalently the branch and region card or the region and center card). The following describes the steps of a cardholder-to-bank-branch transaction. Smart card 102 stands for card 1 and is the card of the person "spending the money", in this case the bank branch. Smart card 104 stands for card 2 and is the card of the person "receiving the money", in this case the cardholder. Somewhere during this transaction the PASSBOOK file of smart card 104 needs to be read, stored and cleared.

Block 501: smart card 102 inserted and Verify PIN. This step is the equivalent of someone at the bank "loading" the bank branch card into a card reader. Block 502: smart card 104 inserted and Verify PIN. This step assures that the proper cardholder still has the card and is similar to using your current card at an ATM (you can be photographed to later prove that it was you). Block 503: second smart card reader port 143 executes smart card 104's C_EXCH. EXE with argument 2 (receive interest). Smart card 104 responds by downloading its security keys. Block 504: second smart card reader port 143 sends these security keys to first smart card reader port 141. Block 505: first smart card reader port 141 executes smart card 102's C_INT.EXE with argument 3 (give interest) and smart card 104's security key. Smart card 102 responds with a security key equal to one of smart card 104's security keys. If no smart card 102 security keys match any of the security keys of smart card 104, then smart card 102 aborts the transaction and sets up an expired key file transaction. Block 506: first smart card reader port 141 sends matching security keys found at block 505 to second smart card reader port 143. Block 507: second smart card reader port 143 sends the matching security key to smart card 104. This key becomes the security key for the rest of the transaction. Block 508: smart card 102 continues response with packet 1 (P1) encrypted using the matching security key. This acts as a challenge to smart card 104. Smart card 102 also updates its PASSBOOK file. Block 509: first smart card reader port 141 sends this packet to second smart card reader port 143. Block 510: smart card 104 responds with packet 2 (P2) encrypted using the matching security key. This is the response to the challenge and smart card 102 checks to make sure that the third field (public name) has been changed from P1 and is a valid name (contains only ASCII characters in a certain range). Smart card 104 also updates its PASSBOOK file. Block 511: second smart card reader port 143 sends this packet to first smart card reader port 141. Block 512: smart card 104 continues response with packet 5 (P5) encrypted in using the matching security key. This acts as a challenge to smart card 102. Block 513: second smart card reader port 143 sends this packet to first smart card reader port 141. Block 514: smart card 102 checks to make sure that the third field (balance)has a valid checksum and a logical date and interest rate. It also checks the fourth field (account number) versus its BAD_CARD file. (If it finds the number in the BAD_CARD file it initiates an invalidate card transaction.) Using its date file, it calculates the amount of interest to credit to smart card 104, debits the amount from smart card 102's card balance and updates its PASSBOOK file. Smart card 102 also looks to see if smart card 104 needs a new updated security key and, if so, supplies one in P6. Block 515: smart card 102 responds with packet 6 (P6) encrypted in the matching security key. Smart card 104 checks to make sure that the third through fifth fields have been changed from P5 and are valid. Block 516: first smart card reader port 141 sends this packet to second smart card reader port 143. Block 517: smart card 104 credits the amount to its card balance, changes the date and updates the interest rate if necessary. If a new key is included in the fifth field, it updates its application keys by replacing the oldest security keys stored in memory with the new security key and incrementing the security key number in the KEY_NUMBER file. It also updates the PASSBOOK file.

Figure 6:
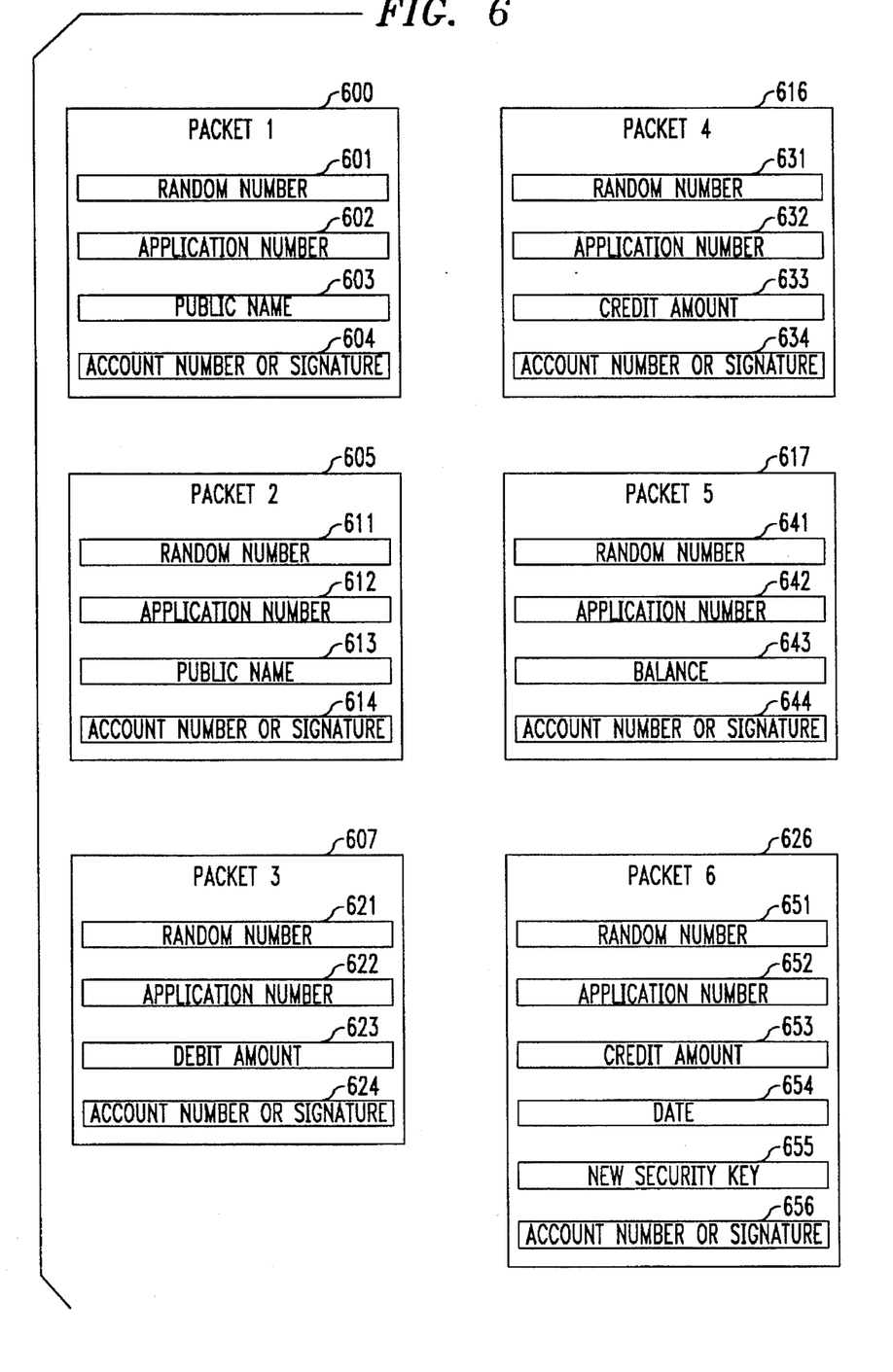
FIG. 6 is a block diagram showing the data structures which are transferred from a first smart card to a second smart card during a financial transaction.

The data packets shown in FIG. 6 may be transferred from a first smart card to a second smart card during a financial transaction. Packet 1 (600.) contains the following fields and information: Field 601: Random Number. The first field is an eight byte random number generated by smart card 102. Field 602: Application Number. The second field is the eight byte application ID number that is the same for all cardholder cards. Field 603: Public Name. The third field is an eight byte ASCII name of cardholder smart card 102. Field 604: Account Number or Signature. The fourth field is either an eight byte signature of the first three fields generated by smart card 102 using the card's matching security key or just smart card 102's account number if privacy is not desired. These four fields are mixed (two bytes at a time from each field) and encrypted using the matching security key and sent from smart card 102 to smart card 104.

Packet 2 (605) contains the following fields and information: Field 611: Random Number. The first field is the eight byte random number that was generated by smart card 102 and received in packet 1. Field 612: Application Number. The second field is the eight byte application ID number that is the same for all cardholder cards. Field 613: Public Name. The third field is an eight byte ASCII name of cardholder smart card 104. Field 614: Account Number or Signature. The fourth field is either an eight byte signature of the first three fields generated by smart card 104 using the card's key 0 or just smart card 104's account number if privacy is not desired. These four fields are mixed (two bytes at a time from each field) and encrypted using the matching security key and sent from smart card 104 to smart card 102.

Packet 3 (607) contains the following fields and information: Field 621: Random Number. The first field is an eight byte random number that is generated by smart card 104. Field 622: Application Number. The second field is the eight byte application ID number that is the same for all cardholder cards. Field 623: Debit Amount. The third field is the amount to be debited from smart card 102's balance file. Field 624: Account Number or Signature. The fourth field is either an eight byte signature of the first three fields generated by smart card 104 using the card's key 0 or just smart card 104's account number if privacy is not desired. These four fields are mixed (two bytes at a time from each field) and encrypted using the matching security key and sent from smart card 104 to smart card 102.

Packet 4 (616) contains the following fields and information: Field 631: Random Number. The first field is the eight byte random number that was generated by smart card 104 and received in packet 3. Field 632: Application Number. The second field is the eight byte application ID number that is the same for all cardholder cards. Field 633: Credit Amount. The third field is the amount to be credited to smart card 104's balance file. Field 634: Account Number or Signature. The fourth field is either an eight byte signature of the first three fields generated by smart card 102 using the card's key 0 or just smart card 102's account number if privacy is not desired. These four fields are mixed (two bytes at a time from each field) and encrypted using the matching security key and sent from smart card 102 to smart card 104.

Packet 5 (617) contains the following fields and information: Field 641: Random Number. The first field is the eight byte random number that was generated by smart card 102 and received in packet 1. Field 642: Application Number. The second field is the eight byte application ID number that is the same for all cardholder cards. Field 643: Balance. The third field contains smart card 104's balance file and is 24 bytes long. Field 644: Account Number or Signature. The fourth field is either an eight byte signature of the first three fields generated by smart card 104 using the card's key 0 (AK0) or just smart card 104's account number if privacy is not desired. These four fields are mixed into 6 groups of 8 bytes and encrypted using the matching security key and sent from smart card 104 to smart card 102.

Packet 6 (626) contains the following fields and information: Field 651: Random Number. The first field is the eight byte random number that was generated by smart card 104 and received in packet 5. Field 652: Application Number. The second field is the eight byte application ID number that is the same for all cardholder cards. Field 653: Credit Amount. The third field is the amount to be credited to smart card 104's BALANCE file. Field 654: Date. The fourth field is the new date and interest rate for smart card 104's BALANCE file. Field 655: New Security Key. The fifth field is 8 bytes long and contains a new application key if smart card 104 does not have the latest key. Field 656. Account Number or Signature. The sixth field is smart card 102's account number because privacy and interest are mutually exclusive. These six fields are mixed into 6 groups of 8 bytes and encrypted using the matching security key and sent from smart card 102 to smart card 104.

Figure 7:
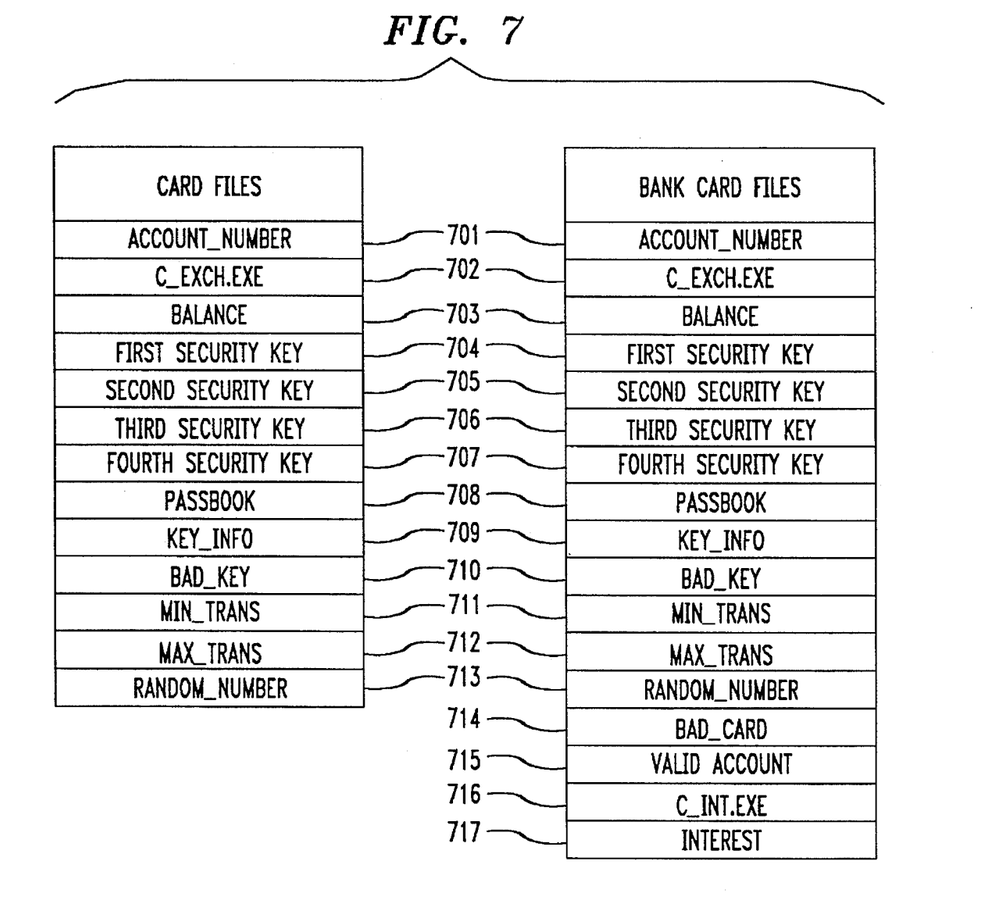
FIG. 7 is a block diagram describing the data structures used by user smart cards.

The data structures used by the user smart cards 102, 104 are shown in FIG. 7. Each user card contains the following files: ACCOUNT_NUMBER 701. This file contains a unique 16-digit account number packed into eight bytes. C_EXCH.EXE 702. This executable file is described above.

BALANCE 703. This file contains the balance amount of the card, the currency of the balance, the last date interest was logged, the serial number of the currency and the balance checksum. The balance amount is 4 bytes long with 6 bits of each byte used to store value and 2 bits used as checksums. The currency of the balance is 1 byte long with a different code for each currency. The date of last interest is 4 bytes long with 2 digits for month, 2 digits for day and 4 digits for year. The interest rate is 3 bytes long. The serial number of the currency is 4 bytes long and represents a number unique to the card (possibly the account number encrypted with a master key). The balance checksum is 8 bytes long and represents the first 8 bytes of the file encrypted by the second 8 bytes of the file and then encrypted by a master key. Thus the balance file is 24 bytes long.

APPKEY0 704 through APPKEY3 707. These files contain the four application keys, each 8 bytes long. PASSBOOK 708. This file contains the audit trail similar to a passbook savings account. Each entry is 36 bytes long and a total of 50 entries can be stored. Each entry includes the account number of the other party (or the signature if privacy is desired) (8 bytes), the public name of the other party (8 bytes), the random number generated by the other card (8 bytes), the date if known (4 bytes), credit or debit or interest (1 byte), the transaction amount (3 bytes) and the new account balance (4 bytes). The total size of this file is 1800 bytes. This file is downloaded to the bank on valid bank transactions unless privacy is desired. If larger files are needed for merchant user cards, 8K cards can be provided and the PASSBOOK file can be greatly expanded.

KEY_INFO 709. This file stores the current APPKEY number and the last date that the keys were updated by the bank. It is 5 bytes (1 for the number and 4 for the date) long. BAD_KEY 710. This file stores the number of bad key attempts and is 2 bytes long. It gets reset after a valid bank transaction. When this number reaches a set limit, the card is locked. MIN_TRANS 711. This file stores the transaction amount above which a PIN is required. This file is 3 bytes long. MAX_TRANS 712. This file stores the transaction amount above which a key is required. This file is 4 bytes long. RANDOM_NUMBER 713. This file contains the random number seed to ensure that the numbers are not repeated in any predictable pattern. If the executable file is 700 bytes long (the same as TCAs), the total space needed on the card would be about 2,700 bytes.

In addition to the files described in the immediately preceding paragraphs, each bank smart card contains the following additional files, also set forth in FIG. 7: BAD_CARD 714. This file stores a list of 4-byte account numbers that are bad cards. It can store a total of 1,200 numbers for a total file size of 4,800 bytes. VALID ACCOUNT 802. This file stores the highest and lowest valid account numbers for cards that can receive key updates. It is 32 bytes long. C_INT.EXE 803. This executable file enables the card to give interest and update keys. INTEREST 804. This file stores the daily interest rate and is 4 bytes long.

With respect to system fraud and fraud prevention, if the smart card system operator has money, defrauders will exist. Defrauders are people who would like to take some of the system operator's money away. Possible methods of attack and countermeasures will now be described. ATTACK #1. Trying to put money on one card without taking money from another card. To do this, a packet of data must be sent to the card, containing the correct information for a credit. There are three possible means of attack: A. Replay attacks, which will not work because each packet contains a unique random number. The system operator must make sure that each card starts with a different random number seed and cannot be reset to its original seed in any way. Since none of the random numbers are ever sent in clear text, this offers some protection. B. Random attempts at sending packets to the card, which will not work because, after so many guesses, the BAD_KEY file will cause the card to lock. This is really the equivalent of trying to guess the key. C. Direct key attack. Under the implementation described above, the defrauder would get a good packet and try to decrypt it with random keys until getting a valid application number. This takes an average of two decryptions per packet and 263 different keys for expected success or 584 years at 1 billion encryptions per second. This is directly related to the security of DES and is what security is based on. Double encryption may be used in risk-prone environments at the expense of slowing the transaction and attack times down.

ATTACK #2. Stealing a valid card. All cards are protected by PINs for small transactions and can be key protected for larger transactions. The thief could use the card for transactions under the MIN_TRANS file limit, but the next time interest/key update occurred, the card would be invalidated. The invalidation process could also happen at point of sale terminals for large purchases if there was fear about PINs or keys being stolen from the cardholder. If the thief attempts to convert the card money into cash (buying cash rather than goods) perhaps by trading with another cardholder, then the thief must have the PIN or key or be limited by the number of transactions stored in the PASSBOOK file (50). Therefore, if the user does not lose their PIN, the maximum expected loss is $250 (if the MIN_TRANS file is set at $5 and no transactions are stored in the PASSBOOK file). This loss can be sent to zero by reducing the number in the MIN_TRANS file to zero. If the PIN is lost, then the amount at risk is potentially 50 times the MAX_TRANS file or the amount stored on the card. IF MAX_TRANS is set at $100, then potentially $5K is at risk. Thus this card is more like cash than a normal credit card and needs to be treated more carefully than a normal credit card.

It is to be understood that the above-described embodiments are merely illustrative principles of the invention and that many variations may be devised by those skilled in the art without departing from the scope of the invention. It is therefore intended that such variations be included within the scope of the following claims.

What is claimed:

1. A method for performing secure financial transactions including the following steps:

(a) storing an electronic representation of a monetary value on a plurality of smart cards organized into a smart card hierarchy, the hierarchy including at least a first smart card at a first hierarchical level and a second smart card at a second hierarchical level lower than the first hierarchical level;

(b) equipping each of the first and second smart cards with an electronic security lock for providing system security, the security lock having a locked state such that the respective smart card is disabled from participating in at least one financial transaction, and an unlocked state such that the smart card may participate in at least one financial transaction;

(c) equipping the first smart card with a first plurality of security keys and the second smart card with a second plurality of security keys;

(d) comparing the first plurality of security keys and the second plurality of security keys to generate a match signal if at least one of the first plurality of security keys matches at least one of the second plurality of security keys, and to generate a no-match signal otherwise, the electronic security lock being responsive to the match signal to enter the unlocked state, and the electronic security lock being responsive to the no-match signal to enter the locked state;

(e) periodically updating the first plurality of security keys by changing the value of at least one of the first plurality of security keys; and (f) downloading the changed value of at least one of the first plurality of security keys from the first smart card into the second smart card, the changed value from the first plurality of security keys replacing a corresponding security key of the second plurality of security keys stored in the second smart card.

2. A method for performing financial transactions as set forth in claim 1 wherein the financial transactions are interest-bearing and include transferring an electronic representation of a monetary value and an interest payment from the first smart card to the second smart card.

3. A method for performing financial transactions as set forth in claim 1 wherein the financial transactions include at least one of:

(i) electronically transferring money from a bank to any one of the plurality of smart cards;

(ii) electronically transferring money from any one of the plurality of smart cards to a bank;

(iii) electronically transferring money from the first smart card to the second smart card;

(iv) electronically transferring money from the second smart card to the first smart card;

(v) checking a smart card balance including the amount of money electronically stored on any one of the plurality of smart cards; and (vi) adding an interest payment to the smart card balance.

4. A method for performing financial transactions as set forth in claim 1 wherein the first smart card includes a first plurality of security keys and the second smart card includes a second plurality of security keys, the comparison step generating a match signal if a plurality of ones of the first plurality of security keys match a plurality of ones of the second security keys.

5. An apparatus for performing secure financial transactions comprising a plurality of smart cards organized into a smart card hierarchy, the hierarchy including at least a first smart card at a first hierarchical level and a second smart card at a second hierarchical level lower than the first hierarchical level;

a) the first smart card including:
   i) monetary value storage means for storing an electronic representation of a monetary value;
   ii) security key storage means for storing a first plurality of electronic security keys;
   iii) security key updating means for periodically updating one or more of the first plurality of security keys; and
   iv) downloading means for downloading updated security keys from the first smart card into the second smart card;

b) the second smart card including:
   i) monetary value storage means for storing an electronic representation of a monetary value; and
   ii) security key storage means for storing a second plurality of electronic security keys;

the first and second smart cards each further including:
   iii) security key comparison means for comparing the first plurality of electronic security keys with the second plurality of electronic security keys, the comparison means producing a match signal if at least one of the first electronic security keys matches at least one of the second plurality of electronic security keys, the comparison means producing a no-match signal otherwise; and
   iv) electronic security lock means coupled to the security key comparison means for enabling the smart card to participate in a financial transaction in response to a match signal and for disabling the smart card from participating in a financial transaction in response to a no-match signal.

6. An apparatus for performing financial transactions as set forth in claim 5 further including:
   (a) first smart card read and write means for reading data from and writing data to the first smart card;
   (b) second smart card read and write means for reading data from and writing data to the second smart card;
   (c) communications link means connected to the first smart card read and write means and the second smart card read and write means for exchanging data between the first smart card and the second smart card.

7. An apparatus for performing financial transactions as set forth in claim 6 wherein the data includes at least one security key.

8. An apparatus for performing financial transactions as set forth in claim 5 further including:
   (a) a third smart card selected from the group of bank center smart cards, merchant smart cards and customer smart cards;
   (b) first smart card read and write means for reading data from and writing data to at least one of the first smart card, the second smart card, and the third smart card;
   (c) second smart card read and write means for reading data from and writing data to at least one of the first smart card, the second smart card, and the third smart card; and
   (d) communications link means connected to the first smart card read and write means and the second smart card read and write means for exchanging data between any of the first smart card, the second smart card, and the third smart card.

9. An apparatus for performing financial transactions as set forth in claim 8 wherein the first smart card is a bank center smart card, the second smart card is a merchant smart card, and the third smart card is a customer smart card, the data including at least one of financial transaction data and at least one security key, the financial transaction data specifying financial parameters including at least one of a quantity of electronic money and an interest rate, the financial transactions including at least one of:
   (i) transferring money from a bank center to any one of the first, second, and third smart cards,
   (ii) transferring money from any one of the first, second, and third smart cards to a bank center,
   (iii) transferring money between any of the first, second, and third smart cards,
   (iv) checking a smart card balance including the amount of money stored on any one of the first, second, and third smart cards, and
   (v) adding an interest payment to the smart card balance.

* * * * *